April 7, 1964   J. W. GREIG   3,128,121
HOLLOW PLASTIC SUN VISOR HAVING DEFORMED AREAS
Filed Oct. 10, 1961   2 Sheets-Sheet 1
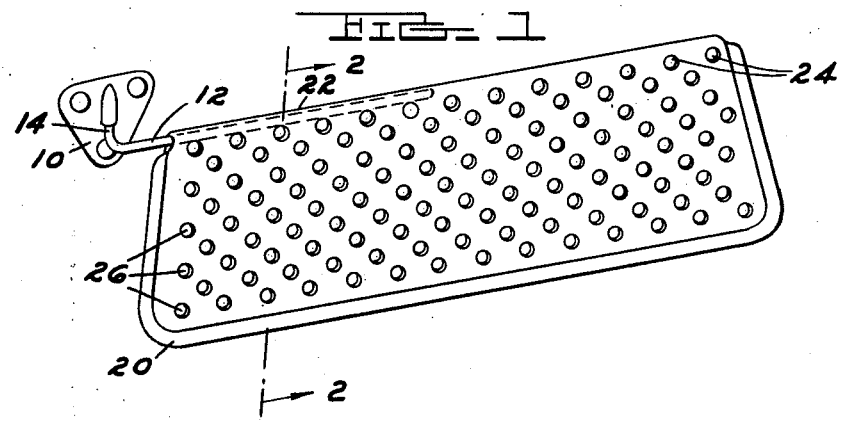
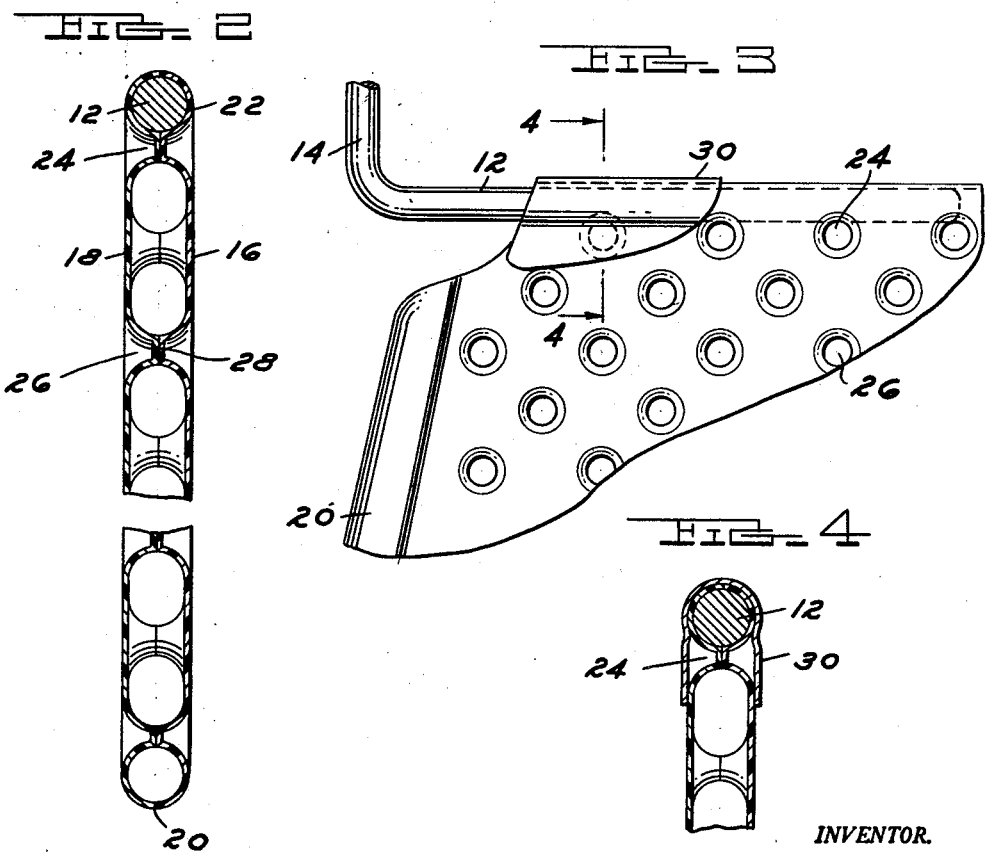
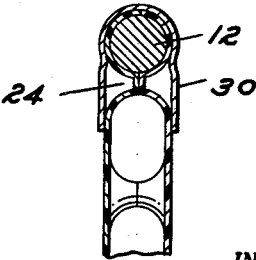
INVENTOR.
JAMES W. GREIG
BY
*Burton & Parker*
ATTORNEYS April 7, 1964 J. W. GREIG 3,128,121
HOLLOW PLASTIC SUN VISOR HAVING DEFORMED AREAS
Filed Oct. 10, 1961 2 Sheets-Sheet 2
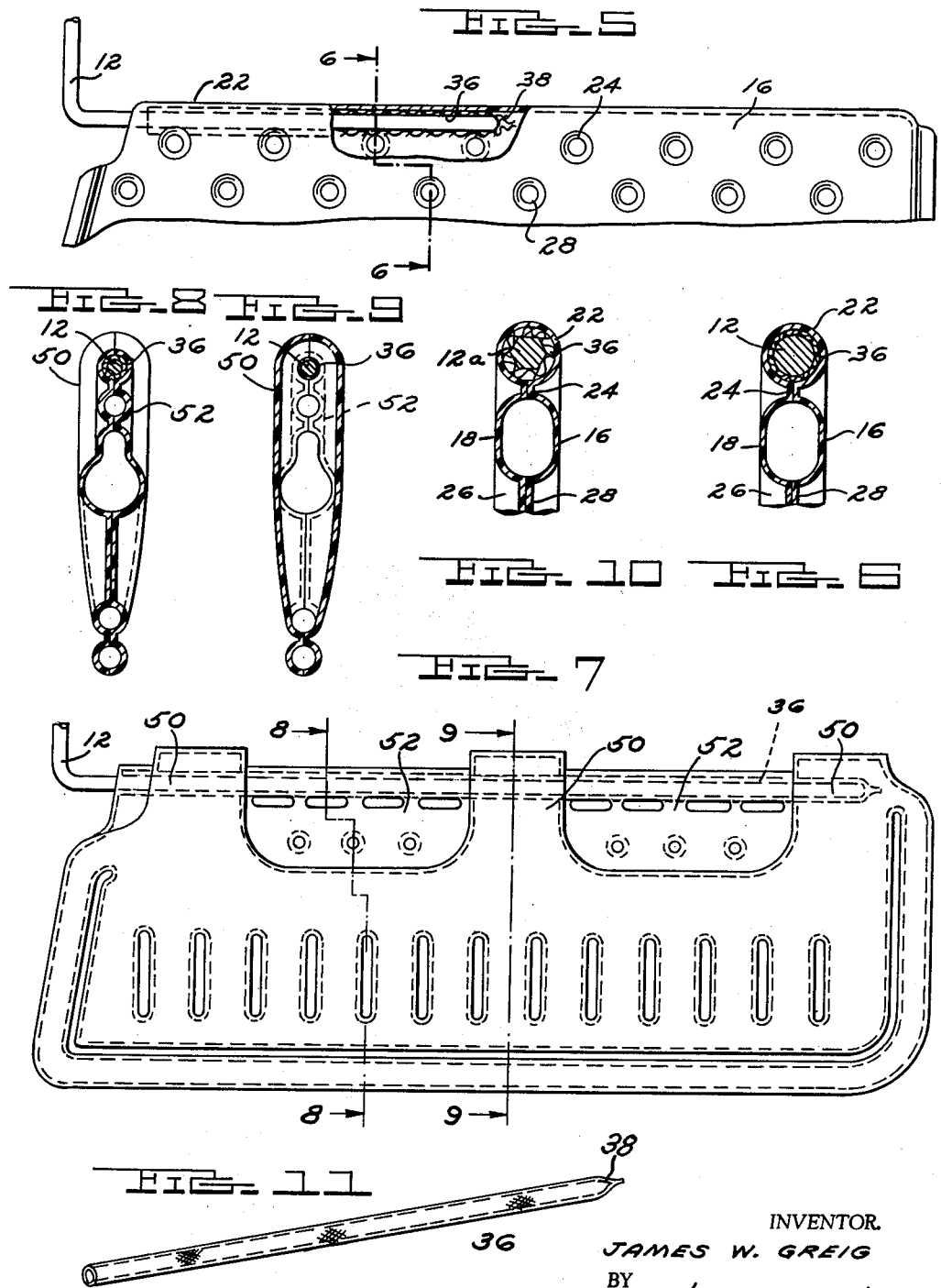
INVENTOR.
JAMES W. GREIG
BY
Burton & Parker
ATTORNEYS

United States Patent Office 3,128,121
Patented Apr. 7, 1964

3,128,121
HOLLOW PLASTIC SUN VISOR HAVING
DEFORMED AREAS
James W. Greig, Grosse Pointe Park, Mich., assignor to Woodall Industries, Incorporated, Detroit, Mich., a corporation of Michigan
Filed Oct. 10, 1961, Ser. No. 151,407
4 Claims. (Cl. 296—97)

This invention relates to an improved visor assembly and to an improved visor blade for such assembly.

An object is to provide an improved visor assembly comprising an improved visor blade and an improved mounting for such blade upon its supporting rod. The visor blade is of light weight but of rugged substantial appearance and construction, and is inexpensive. The blade is adapted to be readily adjustably shifted over the rod to a plurality of different positions thereabout and adapted to securely releasably maintain against accidental displacement the position to which it is adjusted.

Another object is the provision of a visor assembly as described wherein the blade is formed of plastic sheet material which plastic material embodies the structure and decorative appearance of the blade, and forms the bearing about the blade. Such blade is in the form of a hollow structural plastic shape having opposed complementary plastic sidewalls deformed and fused together along complementary boundary margins to form the hollow blade.

Such sidewalls are further fused together along a second line which is parallel to and spaced from a part of one marginal boundary line and provides therewith and between the two fused lines a tubular rod-receiving socket or bearing. Such tubular bearing is adapted to be received over the blade-supporting rod forming a hinge bearing supporting the blade upon the rod for shiftable movement to different adjusted positions thereabout. Said bearing is adapted to grippingly, frictionally retain adjusted positions upon the rod against accidental displacement thereabout and throughout the life of the assembly. Such hinge bearing is formed of the material of which the blade itself is formed.

A meritorious feature of my hollow plastic blade is that it provides maximum strength with minimum weight. It is relatively flexible and shock absorbing. It is sufficiently stiff to be self-supporting upon rotatable adjustment about the rod without undue bending and under pressure applied to the free margin of the blade to accomplish such rotatable adjustment.

Another meritorious feature is that the plastic visor blade comprises complementary plastic sheets deformed and fused together along complementary boundary margins and also deformed and fused together at a plurality of connecting bridging points spaced apart within the area surrounded by said fused boundary margin. Said blade is further deformed and fused together along a second line parallel to and spaced from a portion of the fused marginal boundary as hereinabove set forth to provide the supporting rod-receiving bearing. The fusing of the two sheets together along said second line is at a plurality of spaced points only whereby the plastic blade does not exhibit along said second fused line a weakened line along which it might break or fracture upon pressure of rotation applied to the free margin of the blade.

Another meritorious feature of the preferred embodiment of my visor assembly is the provision of a friction sleeve mounted upon the visor blade-supporting rod with the sleeve covered rod received within the rod-receiving socket of the blade for adjustment of the blade thereover. Some plastic materials of which my blade can be constructed are susceptible under continued use or disuse and under certain varying temperature changes to deformation. Such deformation may interfere with the blade retaining its adjusted positions upon the rod. The employment of this friction sleeve, which is not susceptible to alteration under varying temperature changes, insures proper functioning of the blade at all times.

More specifically the sleeve may be formed of a fibrous material so fabricated that it resiliently grippingly embraces the rod so as to retain its place thereupon and holds the blade releasably frictionally at adjusted positions thereabout. A knitted fabric sleeve constitutes a satisfactory embodiment of such a rod-gripping sleeve. If desired, however, the sleeve may be woven. It may be so constructed as to require adhesive or other form of securement to the rod, so that the blade may be rotated frictionally over the sleeve covered rod.

While the blade possesses thin walls and light weight its hollow character and rugged heavy cushioned appearance and ready receptivity to simple decoration or contouring make it particularly desirable for use as an automobile visor.

Other objects, advantages and meritorious features will more fully appear from the following specification, claims and accompanying drawings, wherein:

FIG. 1 is a perspective of my improved visor blade mounted upon a conventional supporting rod of a common type of bracket;

FIG. 2 is a sectional view taken on the line 2—2 of FIG. 1;

FIG. 3 is a fragmentary elevation of a slightly modified form of the structure shown in FIGS. 1 and 2;

FIG. 4 is a sectional view taken on the line 4—4 through the modification shown in FIG. 3;

FIG. 5 is a broken away elevation of a second modification of the visor assembly comprising a supporting rod and a blade mounted thereon;

FIG. 6 is a cross-sectional view taken on the line 6—6 of FIG. 5;

FIG. 7 is an elevation similar to FIG. 5 but showing a third modification of the visor assembly;

FIG. 8 is a cross-sectional view taken on line 8—8 of FIG. 7;

FIG. 9 is a cross-sectional view taken on line 9—9 of FIG. 7;

FIG. 10 is a cross-sectional view taken on the same line as FIG. 6 showing a hexagonal rather than a round supporting rod; and FIG. 11 is a perspective of a sleeve element adapted to be mounted upon the visor rod as shown in FIGS. 5 through 10.

The visor blade herein shown is of the same general character disclosed in applicant's abandoned application for Visor, 760,901, filed September 15, 1958. It is mounted upon a blade-supporting rod 12. This rod is carried by a supporting bracket 10. This bracket is mounted within the interior of an automobile body. The rod 12 has a short angular end portion 14 pivotally mounted upon bracket 10 for the usual pivotal displacement of the rod with respect to the bracket. The visor blade is rotatably supported upon the long leg of the rod 12 as shown.

The blade itself is a hollow structural plastic shape preferably formed from two complementary plastic sheets indicated as 16 and 18. Such plastic sheets may be provided in any desired color and decorative fashion. The complementary margins of the two sheets are deformed and fused together to form the perimeter 20 of the blade, providing a hollow unitary light weight structure. The blade may be formed of plastic and possesses sufficient flexibility so that it can be juxtaposed against the curved surface of a windshield and will somewhat conform thereto. It is, however, sufficiently rigid to serve all of its required functions.

Along one lineal marginal portion of the blade spaced from and parallel to said fused margin thereof the two sheets are further deformed and fused together along a second line providing with said first line of fusion a tubular socket 22 within which socket the blade-supporting rod is received. This fusing of the two sheets together along said second line is a deforming and fusing only at certain spaced bridging connecting points 24 as shown. This discontinuous second line of fused securement provides with the fused marginal boundary line a peculiarly efficient rod-receiving bearing portion. Such bearing portion grippingly, frictionally embraces the rod to maintain the blade at adjusted positions thereabout. At the same time the discontinuous line of fused securement minimizes any tendency toward breakage or rupture of the plastic sheets themselves along said second line of fused securement as might occur if such second line of fusion were continuous. If said second line of fused securement were continuous it would tend to become a weakened hinge line with danger of breakage or rupture of the plastic sheets therealong upon pressure of rotation applied to the blade from its free margin.

The two plastic sheets which make up the blade may be sheets of polyethylene plastic or any other suitable thermo plastic. The blade may be formed of two sheets as hereinabove set forth or it might be formed of a single sheet folded upon itself to form a bight about the rod or the hollow visor structure might be flow molded. The two sheets are relatively flexible and resilient but sufficiently stiff to be self-supporting under all conditions of required usage.

The two opposed complementary sheets 16 and 18 which are fused together to form the hollow plastic visor blade are further deformed and fused together at selected bridging connecting points spaced apart throughout the area of the blade bounded by the fused boundary line as shown. These bridging connecting points are in the form of protuberances 26 deformed out of the plastic sheets 16 and 18 and fused together at their apices 28 within the planar area of the blade as shown in FIGS. 2, 6 and 8. These protuberances or bridging portions deformed out of the two sheets and fused together at their abutting apices 28 secure the two sheets together in braced spaced apart relationship forming a sturdy light weight visor blade. This method of securement of the two sheets together imparts not only structural strength but decorative appearance.

A process and apparatus suitable for molding hollow structural plastic shapes such as this visor blade is disclosed in my joint application with Marvin H. Cunningham, Serial No. 69,521, filed November 15, 1960. Such a process and apparatus lends itself to rapid manufacture of hollow plastic shapes such as the visor blade here illustrated.

Such a construction of thin plastic sheets provides a visor blade which is not only self-supporting but is relatively rigid and presents an appearance of thickness which is desirable. It is sufficiently rigid and self-supporting to be rotatably displaced about the rod by pressure of rotation applied to the free margin of the blade without undue bending of the blade. The blade, however, also possesses considerable resiliency and may be moved against the inner surface of a curved windshield and will generally conform somewhat therewith. The blade is of so light a weight that very little frictional resistance is required to maintain it at adjusted positions of rotation about the rod 12 to which it may have been moved. The dimples or bridging protuberances shown are generally conical in shape but it is understood that such bridging portions might take any desired contour and might be arranged in any desired pattern.

The visor blade shown in FIG. 1 normally possesses sufficient gripping action to serve all required uses but a clip 30 such as shown in FIGS. 3 and 4 may be used if desired. The construction shown in FIGS. 3 and 4 includes a small metal spring clip 30 received over the margin of the blade which augments the frictional grip of the two plies of the visor blade about the rod.

The rod may have a length substantially equal to that of the blade as shown in FIG. 7 or it may be of short length as shown in FIGS. 1 and 5. The rod 12 may be of such a length that the visor blade may be shiftably adjusted lengthwise thereover and frictionally retained at adjusted positions thereon.

The construction shown in FIGS. 5 through 11 is the preferred construction. Such comprises a visor blade and rod assembly as generally shown in FIG. 1 plus the employment of a friction sleeve 36 closed at one end as at 38. This sleeve is securely received over the rod 12 and/or 12a, FIGS. 5 and 10 respectively. This sleeve may be formed of woven or knitted fabric or of any suitable fibrous or other satisfactory friction material fabricated in sleeve form and capable of being securely received about the rod and which sleeve is not subject to permanent deformation under variations of temperature or use as the plastic tubular socket of the blade itself might be. Such a sleeve may be sufficiently resilient to frictionally maintain its position upon the rod 12. It presents sufficient frictional resistance to rotation of the visor blade thereover so that the blade securely maintains any position of rotation to which it has been adjusted about the sleeve-covered rod against accidental displacement of the blade.

A knitted sleeve not only is sufficiently resilient to frictionally grip the rod and retain its position thereon permitting the blade to rotate thereover, but such a sleeve may be readily pushably inserted over the rod or removed therefrom while attempts to stretchably draw such knitted sleeve over the rod or draw the same off the rod result in increasing contraction of the sleeve more tightly about the rod and increasing resistance to its slidable movement. A woven or otherwise fashioned friction sleeve may be cemented or otherwise fastened to the rod if desired.

Rotation of the visor blade about the sleeve-covered rod is readily accomplished and the blade holds its adjusted positions notwithstanding the fact that temperature changes or passage of time during long periods of use or disuse may produce some deformation in the plastic tubular socket itself.

If desired the visor rod 12 may be provided in non-circular form such as the hexagon rod 12a of FIG. 10 or the rod might be roughened or otherwise shaped to hold the sleeve thereupon more securely.

The visor blade shown in FIGS. 7, 8 and 9 presents a sturdy, rugged cushioned appearance. Adjacent to each end and through an intermediate portion as along cross-sectional line 9—9 the opposite side walls 16 and 18 are spaced a substantial distance apart as shown at 50. Along the section line 8—8 the opposite sides are displaced toward each other as at 52. As a result a thickened decorative embossed contour is given to the visor blade.

What I claim is:

1. A hollow plastic visor blade having two opposed plastic side walls secured together along the marginal boundary of the blade and with certain opposed areas of said side walls deformed and spaced apart forming a hollow stiffly resilient blade structure, said two side walls having other areas deformed and fused together along a second line spaced from and parallel to a portion of said boundary line providing therewith a marginal tubular rod-receiving socket bearing, said two side walls fused together along said second line only at and by a plurality of spaced bridging connecting points between which points the two side walls are spaced apart, said blade adapted to be mounted upon a rod received within said bearing, said bearing portion of the blade so formed as to releasably, grippingly embrace the rod whereby the blade may be rotated about the rod and releasably, frictionally maintained at adjusted positions of rotation thereabout, said blade being somewhat flexible but sufficiently rigid and self-supporting to respond without undue bending to pressure of rotation applied to the free margin of the blade to rotate the blade about the rod.

2. A visor blade as defined in claim 1 characterized in that said two sidewalls are also deformed and fused together at a plurality of bridging connecting points located spaced apart within the area surrounded by said boundary margin providing a decorative appearance and rigidifying the structure.

3. A visor blade as defined in claim 2 characterized in that said bridging connecting points are deformed out of the planes of the two sheets as generally conical complementary protuberances and fused together at their abutting apices between the two sheets.

4. A visor blade and rod assembly comprising a visor blade characterized as defined in claim 1 mounted upon a visor blade-supporting rod received within the tubular marginal bearing of the blade, said rod provided with a flexible fabric sleeve grippingly, frictionally embracing that portion of the rod received within the bearing of the blade, said blade rotatable about said sleeve-covered rod to different positions of adjusted rotation.

References Cited in the file of this patent

UNITED STATES PATENTS

| | | |
|---|---|---|
| 1,473,362 | Tilton | Nov. 6, 1923 |
| 1,775,486 | Clements | Sept. 9, 1930 |
| 2,272,290 | Beal | Feb. 10, 1942 |
| 2,522,079 | Winstead | Sept. 12, 1950 |
| 2,628,125 | Jacobs | Feb. 10, 1953 |
| 2,901,038 | Herr et al. | Aug. 25, 1959 |
| 2,965,415 | Dryden | Dec. 20, 1960 |

FOREIGN PATENTS

| | | |
|---|---|---|
| 824,693 | France | Nov. 18, 1937 |
| 1,123,335 | France | June 11, 1956 |

OTHER REFERENCES

German application, 1,014,858, Aug. 29, 1957, K1 63c58.